United States Patent
Encaoua et al.

(10) Patent No.: US 9,110,312 B2
(45) Date of Patent: Aug. 18, 2015

(54) MEASUREMENT METHOD AND EQUIPMENT FOR THE CUSTOMIZATION AND MOUNTING OF CORRECTIVE OPHTHALMIC LENSES

(75) Inventors: David Encaoua, Carrieres sur Seine (FR); Pascal Thomet, Paris (FR); Julien Sagnard, Montreuil sous Bois (FR)

(73) Assignee: INTERACTIF VISUEL SYSTEME (IVS), Paris (FR)

( * ) Notice: Subject to any disclaimer, the term of this patent is extended or adjusted under 35 U.S.C. 154(b) by 258 days.

(21) Appl. No.: 13/499,882

(22) PCT Filed: Oct. 5, 2010

(86) PCT No.: PCT/FR2010/000662
§ 371 (c)(1),
(2), (4) Date: Jun. 22, 2012

(87) PCT Pub. No.: WO2011/042623
PCT Pub. Date: Apr. 14, 2011

(65) Prior Publication Data
US 2012/0257162 A1    Oct. 11, 2012

(30) Foreign Application Priority Data
Oct. 5, 2009 (FR) .................................. 09 04757

(51) Int. Cl.
*A61B 3/10* (2006.01)
*A61B 3/00* (2006.01)
*G02C 13/00* (2006.01)

(52) U.S. Cl.
CPC .................................. *G02C 13/005* (2013.01)

(58) Field of Classification Search
USPC ......... 351/200, 204–206, 208, 220–222, 243, 351/246
See application file for complete search history.

(56) References Cited

U.S. PATENT DOCUMENTS

2009/0021693 A1   1/2009   Sessner et al.
2010/0128220 A1*  5/2010   Chauveau ..................... 351/204

FOREIGN PATENT DOCUMENTS

FR    2 914 173 A1   10/2008

* cited by examiner

*Primary Examiner* — Stephone B Allen
*Assistant Examiner* — Brandi Thomas
(74) *Attorney, Agent, or Firm* — Arent Fox LLP

(57) ABSTRACT

A method for measuring the position of a virtual characteristic point (PRV) associated with the face of a person wearing corrective lenses, said method comprising: acquiring at least two images of the wearer's face using an image acquisition means; estimating the position of the face in relation to the image acquisition means; and determining, on the images, the co-ordinates (Xpref, Ypref) of reference points associated with the face. Given that the virtual characteristic point is visible on at most one image and that the position of the virtual characteristic point is connected to the co-ordinates of the reference point(s) by a predetermined geometric relationship, the measurement method also comprises calculating at least one of the co-ordinates (XPRV, YPRV, ZPRV) of the virtual characteristic point (PRV) on the basis of the reference point(s), using the geometric relationship.

12 Claims, 4 Drawing Sheets

MEASUREMENT METHOD AND EQUIPMENT FOR THE CUSTOMIZATION AND MOUNTING OF CORRECTIVE OPHTHALMIC LENSES

CROSS-REFERENCE TO RELATED APPLICATION

This Application is a National Stage entry of International Application No. PCT/FR2010/000662, having an international filing date of Oct. 5, 2010; which claims priority to French Application No.: 0904757, filed Oct. 5, 2009; the disclosure of each of which is hereby incorporated in its entirety by reference.

TECHNICAL FIELD

This invention relates to the field of taking measurements performed by an optician in order to customise corrective ophthalmic lenses and mounting of said lenses on the frame.

PRIOR ART

The optician acquires the data necessary to optimise the preparation of corrective lenses on a patient equipped with frames that he or she has chosen, so as to determine data relating to the corrective lens implantation configuration opposite the wearer's eyes.

The prior art includes:

the French patent FR 2914173, which describes a method for measuring the position, according to a horizontal direction of the sagittal plane, of a remarkable point of the subject's eye, in particular the eye's centre of rotation (CRO) at a reference point associated with the subject's head, characterised in that it comprises the steps of:

S1) arranging, in a first relative posture, the subject's head with respect to the pupil for insertion of an image capture device arranged opposite the subject's face, S2) in this first relative posture, capturing a first planar image of the eye by means of the image capture device, S3) identifying, in this first image, the image of a first predetermined reference point of the eye, S4) arranging, in a second relative posture of the subject's head with respect to the pupil for insertion of the image capture device, different from the first relative posture, S5) in this second relative posture, capturing a second planar image of the eye by means of the image capture device, S6) identifying, in this second image, the image of a second predetermined reference point of the eye, S9) calculating said position of the remarkable point of the eye according to the images of the first and second reference points of the eye and first and second values of a geometric posture parameter respectively associated with the first and second relative postures. The approaching of the images of the first and second reference points of the eye is representative of the apparent angular movement of the eye from the two different points of view corresponding to the first and second relative postures. A parallax calculation then makes it possible, in consideration of the information on the two points of view of the first and second values of the posture parameter, to obtain the desired position.

The parallax calculation proposed in order to calculate the position of the remarkable point of the eye consists of performing the sub-steps of:

deducing, from the image of the first reference point of the eye and the first value of the posture parameter, coordinates, at said reference point of the subject's head, a first observation line (DO1) connecting the pupil of the image capture device to the first reference point of the eye, deducing, from the image of the second reference point of the eye and the second value of the posture parameter, coordinates, at said reference point of the subject's head, a second observation line (DO2) connecting the pupil of the image capture device and the second reference point of the eye, calculating the position of the remarkable point of the subject's eye at the reference point associated with the subject's head on the basis of coordinates of first and second observation lines. The remarkable point of which the position is sought is the centre of rotation of the eye of the subject in which the position of this point is calculated as the position of the intersection point or, if these lines are not strictly secants, of the greatest proximity of the two observation lines.

This known solution for measuring a remarkable point of the eye by parallax calculation provides precise information on the geometric-physiognomic position of the eye's centre of rotation only when the axis of the gaze, defined by the line passing through the eye's centre of rotation (CRO) and the centre of the pupil of the eye, passes exactly through the optical centre of the entrance lens of the camera, and the reference points chosen for each of the two images are the centre of the pupil of the eye.

Indeed, the intersection of the observation lines (DO1 and DO2) mentioned in the solution provides the position of a reference point of the eye in space with respect to the subject's head, if, between the two image captures, this point is not moved with respect to the subject's head. The eye's centre of rotation does not move with respect to the subject's head, but, as it is not physical, it cannot be seen in the image and cannot therefore be used directly as a so-called reference point. The pupil is visible, but to measure its centre of rotation, the eye must rotate between the two image captures, which means that the subject's pupils move, like all of the points of the eye distinct from the centre of rotation thereof. The intersection of the observation lines (DO1 and DO2) does not therefore provide the position of the pupils. However, when the subject focuses on the entrance lens of the camera, i.e. when the axis of the gaze passes through the optical centre of the entrance lens of the camera, the eye's centre of rotation (CRO) is aligned with the centre of the pupil of the eye and the optical centre of the camera, which causes the observation lines DO1 and DO2 to coincide with the axis of the gaze and to intersect at the level of the eye's centre of rotation (CRO). In other words, the CRO and the centre of the pupil of the eye coincide in the images captured by the camera. The parallax calculation using the pupil as the reference point then gives the position of the CRO and the measurement sought is then correct.

However, when the subject does not precisely focus on the acquisition camera, the observation lines DO1 and DO2 do not coincide with the axis of the gaze and the CRO no longer coincides with the pupil in the images. The parallax calculation proposed, based on the centre of the pupils, therefore gives a point at a distance from the position of the eye's centre of rotation CRO and the results concerning the measurement of the position of the eye's centre of rotation (CRO) are therefore incorrect.

In addition, a study of the prior art shows that a large number of existing electronic measurement systems for centring corrective lenses on eyeglass frames are done for a head position and a convergence of the eyes when the wearer is far-sighted (i.e. the wearer focuses on an infinite point directly in front of him or her). This far-sighted vision will be reproduced either by moving the camera farther away—but this makes its use difficult due to the need for space in the store and the distance between the optician and the client—or by means of an optical system projecting an image virtually placed at an infinite point or at a distance from the wearer.

Alternatively, it is possible to bring the camera closer by arranging it, for example, 80 cm from the wearer, using a mirror placed opposite the wearer, also at 80 cm. The wearer then looks at him or herself in the mirror, i.e. at a virtual distance of 160 cm, which becomes acceptable for measurements relating to far-sightedness. However, in this case, the axis of the gaze of each eye does not pass through the optical centre of the camera and the error on the CRO is significant.

These problems with the solution proposed by the French patent FR 2914173 therefore involve significant constraints on the implementation of the method since the results will be precise only if the axis of the gaze is precisely aligned with the entrance pupil of the camera. These problems will be amplified when the wearer is not warned of the importance of strict observation of instructions regarding the direction in which he or she must focus his or her gaze.

The consequence is that the data provided can be affected by a significant error, resulting in the production of corrective lenses of which the customisation is based on inaccurate data and therefore resulting in the production of lenses that are not in fact optimal.

DESCRIPTION OF THE INVENTION

The term "remarkable virtual point (PRV)" is used to refer to a point that is visible only in one image at most obtained by image acquisition means, and which is useful in measurements conducted in the context of production of customised corrective lenses and/or in the mounting of corrective lenses.

In order to solve one or more of the disadvantages cited above, a method for measuring the position of a remarkable virtual point associated with the face of a subject wearing corrective lenses in a spatial reference (RS) point associated with the corrective lenses, the eyeglass frame or more generally the head of said subject, comprises:
- a step of acquiring at least two images of all or some of the face of the subject by image acquisition means;
- a step of estimating the position of the face with respect to the image acquisition means by image processing;
- a step of determining, in the images, coordinates of one or more reference points associated with the face.

In addition, as the remarkable virtual point is visible in at least one image and the position of the remarkable virtual point is associated by a predetermined geometric relationship with the coordinates of the reference point(s), the measurement method also comprises a step of calculating at least one of the coordinates of the remarkable virtual point at the spatial reference point on the basis of coordinates determined for the reference point(s) by using the geometric relationship.

Specific features or embodiments, which can be used alone or in combination, are as follows:
- the geometric relationship is defined by the coordinates of the reference points in at least two images;
- said reference points of the geometric relationship vary at the spatial reference point of the acquisition, from one image to another;
- the geometric relationship includes a geometric modelling of the eye focusing on a target, the three-dimensional modelling or projected onto the plane of the at least two images;
- the reference point in at least two images is the geometric centre of the iris, the cornea or a corneal image caused by at least one external source;
- the step of calculating at least one of the coordinates of the remarkable virtual point consists of:
  - applying an initial hypothesis for a theoretical remarkable virtual point to at least one of said coordinates;
  - calculating a theoretical reference point by using the geometric relationship;
  - if the distance between the theoretical reference point and the reference point observed is greater than a predetermined value, modifying said hypothesis at least once so as to minimise said distance;
- the remarkable virtual point (PRV) is the eye's centre of rotation (CRO); at least two of the images are acquired in situations corresponding to distinct angles of vision/head; and the direction of the gaze does not pass, in at least one image, through the optical centre of the image acquisition means;
- during the image acquisition, the subject looks at a focal point generated by a device, with the optical distance between the subject's eye and the focal point being different from the optical distance between the subject's eye and the acquisition means. In a particular case, the subject looks at his or her reflection during the acquisition of images by means of a mirror;
- the image acquisition means are comprised of a camera recording a sequence of images;
- the recording of the images occurs when the subject looks at a focal point PF of which the position with respect to the image acquisition means is known;
- it also comprises a step of estimating the direction of the gaze, taking into account at least two characteristic points of the eye on said images;
- as the acquisition means comprise at least two image capture devices, the step of estimating the position of the face with respect to the image acquisition means is performed by processing a series of images acquired simultaneously; and/or
- the step of estimating the position of the face with respect to the image acquisition means by processing said images is performed by acquiring an image of the subject wearing a device equipped with at least three reference markers.

In a second aspect of the invention, a method for determining the Frankfort plane of a subject includes:
- for each eye of the subject, the determination of the position of a remarkable virtual point of the eye by applying the method above;
- the determination of the position of the sub-orbital point of each eye by a predetermined geometric relationship with the remarkable virtual point of said eye;
- the determination of the position of the subject's tragion in at least one of the images taken during the step of determining the remarkable virtual point;
- the determination of the Frankfort plane on the basis of the position of the tragion and the sub-orbital points.

In a third aspect of the invention, a method for measuring the radius of the eye implements the above method for calculating either the eye's centre of rotation (CRO) or a point of which the distance with respect to the edge of the cornea is known.

In a fourth aspect of the invention, a method for determining the position of the boxing rectangle of a corrective lens of eyeglasses of a subject includes:
- the positioning on the eyeglasses of a positioning template including measurement points;

the determination of the positions of the two apexes of the boxing rectangle by the above position measurement method in which each apex is considered to be a remarkable virtual point and the reference points are measurement points.

In a fifth aspect of the invention, a system for measuring the position of a remarkable virtual point associated with the face of a subject wearing a corrective lens at a spatial reference point associated with the corrective lens, comprises:

means for acquisition of at least two images of all or some of the subject's face;

a device for calculating the position of the face with respect to the image acquisition means by image processing;

means for determining, in the images, coordinates of one or more reference points associated with the face.

In addition, as the remarkable virtual point is visible in at least one image and the position of the remarkable virtual point is associated by a predetermined geometric relationship with the coordinates of the reference point(s), the measurement system also comprises a device for calculating at least one of the coordinates of the remarkable virtual point at the spatial reference point on the basis of the determined coordinates of the reference point(s) by using the geometric relationship.

In a sixth aspect of the invention, a computer program includes program code instructions recorded on a computer readable medium, for implementing the steps of the method described above when the program is run on a computer.

BRIEF DESCRIPTION OF THE DRAWINGS

The invention can be better understood in view of the following description, provided solely as an example, and in reference to the appended figures in which.

METHODS FOR CARRYING OUT THE INVENTION

The term "remarkable virtual point (PRV)" refers to a point that is visible only in one image at most obtained by image acquisition means, and which is useful in measurements conducted in the context of production of customised corrective lenses and/or in the mounting of corrective lenses. In particular, the remarkable virtual point PRV can be:

the eye's centre of rotation CRO;

one of the apexes of the rectangle containing the lens ("boxing rectangle"). The boxing rectangle corresponds to the rectangle containing the exterior cutout of one of the two corrective lenses. As the frame and the lens are not generally planar, this surrounding rectangle is treated as a rectangle containing the projection of the external cut-out of the lens on the neutral plane of the lens (see FIGS. 1 and 2); and/or the tragion of the eye when it could not at least be identified correctly in two images.

Figure 3:
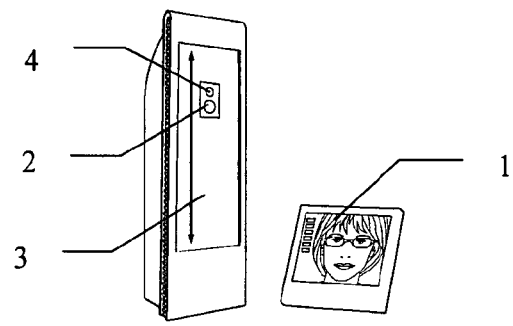
FIG. 3 is a general view of equipment according to an embodiment of the invention.
Figure 4:
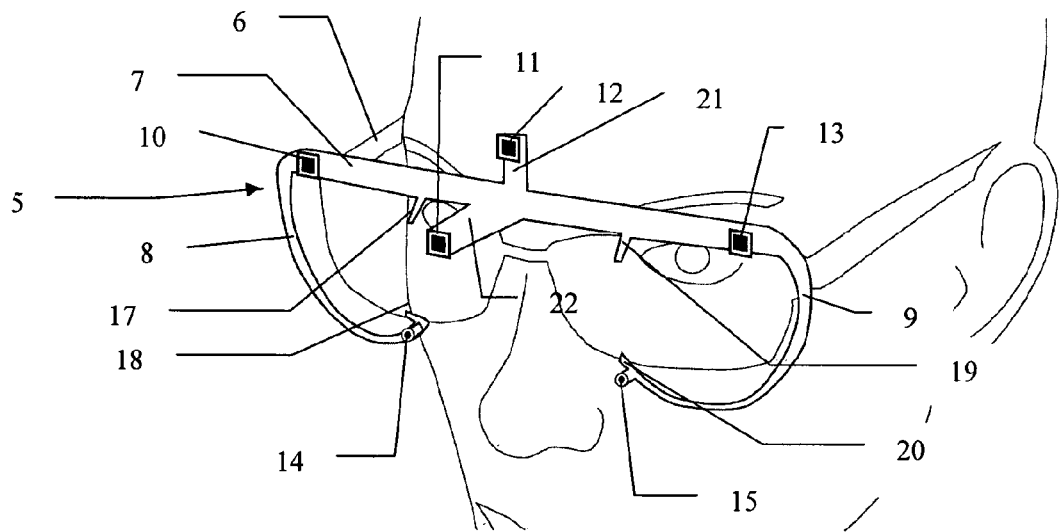
FIG. 4 is a three-quarter front view of a clip-type accessory for implementation of an embodiment of the invention.

In reference to FIG. 3, the equipment for determining the PRV includes:

a display screen 1 with cathode rays or liquid crystals;

an image capture device 2 of the single-frame image capture type or of the moving image capture type. It is generally a digital camera or, according to a particular alternative, an analogue camera associated with an acquisition and video processing circuit;

a sighting device consisting, in the example embodiment described, of a one-way mirror 3. This device is intended to provide a focal point (PF) for the wearer;

a lighting device 4 intended to illuminate the face of the wearer, in particular in order to form a reflection on the cornea of the eyes of said wearer;

a device such as the accessory 5 of FIG. 4 intended to position the wearer's head, the eyeglass frame or the corrective lenses;

a central unit; and system control means (keypad, mouse, touch screen, buttons, etc.).

The image capture device 2 is connected to the central unit by means of a suitable video acquisition and camera control interface, which controls the screen via a video output circuit. The user, generally an optician, can control the system, for example by means of a keypad, a mouse, a touch screen interface, and so on.

The eyeglass wearer is positioned in front of the camera 2, the mirror 3 is placed opposite the wearer and is just in front of the camera 2 if it is a one-way mirror, or just below it if it is a conventional mirror, so that the wearer can position his or her gaze toward the reflection of a point of his or her face in the mirror 3 during the image acquisition (for example, he or she looks at the middle of the frame bridge or the middle of his or her nose). The mirror 3 thus makes it possible to simulate a focal point (PF) double the distance of the device, which is advantageous for taking measurements in the "far-sighted" position while keeping the device relatively close to the wearer. In addition, a differential calculation shows that, advantageously, the CRO measurement errors due to poor convergence of the gaze will be two times lower in this situation (convergent gaze toward a reflection in a mirror) than in the situation in which the wearer is asked to look at the entrance pupil of the camera.

Advantageously, the sighting device includes a one-way mirror, placed on the structure opposite the eyeglass wearer, behind which the image capture device 2 is positioned in a cavity provided for it. The device can also include vertical movement means, powered or manual, for adjusting the height of the image capture device 2 in order to place it at the level of the eyeglass wearer's gaze.

An optional lighting device 4, i.e. in the example described a light-emitting diode, is arranged above the camera. It is intended to form an image on the cornea, representing one or more remarkable points of the eye, called the corneal reflection (RC), visible in the image captured by the camera. An alternative to this device is to measure the position of the pupil and optionally its size and shape in the image.

The image capture device 2 can also be portable. Thus, the operator can easily obtain images by being positioned opposite the subject's face, in order to obtain the necessary images. The sighting device can then, for example, be a conventional mirror placed just below the image capture device 2.

According to a particularly simple and economical embodiment, the image capture device 2 can be a simple photographic device, taking two or more images in succession.

It can also be a video camera, recording the first and second image captures, as well as all or some of the movement of the wearer during the rotation scanning around the vertical axis. The selection of the optimal first and second captures among the plurality of captures taken by the camera can then be performed, for example, according to the method described in document FR 2 860 887 by the applicant.

The equipment is implemented as follows.

The wearer is equipped with a frame 6 on which a clip-type accessory 5 is placed, of which FIG. 4 shows an example embodiment.

This accessory 5 is intended to be secured to the eyeglass wearer's head.

The accessory 5 is made, for example, of a transparent plastic material, includes a main body 7 formed by a horizontally elongate support member and two flexible curved rods 8, 9. The accessory 5 comprises a certain number of visual references, or markers 10 to 13, preferably at least three.

In the example described, the accessory 5 includes four high marker zones 10 to 13 with a well-defined spectral colour, for example bright green, and two other low markers 14, 15 with a shape and colour preferably different from those of the high markers 10 to 13.

It also includes two frame attachment assemblies, formed by a first pair of clamps 17, 18, and a second pair of clamps 19, 20 for attaching the accessory 5 on the frame.

In this way, when the wearer puts on the eyeglasses (corrective or optically neutral, or even blank) in a stable position, and the accessory 5 has been positioned on the frame 6, it occupies a well-defined and stationary position with respect to the frame 6 and the wearer's head.

Indeed, the four hooks 17 to 20 define bearing points known with respect to the markers 10 to 15, which will be placed at characteristic points of the lens.

The accessory 5 also includes, starting at the middle of the main body 7, a branch 21 that extends vertically and a projecting portion 22 that extends horizontally, substantially perpendicularly to the body 7. Two markers 11, 12 of the four markers of the main body 7 are then respectively located at the level of the free end of the projecting portion 22 and the vertical branch 21.

The two markers 10 and 13 are located at the left and at the right. The last two markers 14, 15 are located just below the bottom hooks 17, 20.

Of course, any other arrangement of markers, as the case may be, greater or fewer in number, can be used according in particular to the types of movements to be analyzed, the desired precision and any ambiguities to be solved when the markers are inadequate in number and/or too uniformly spaced apart.

The equipment then takes two images of the subject wearing the eyeglasses with this accessory.

The image capture device 2 first performs a first image capture (image 1) of the face of the eyeglass wearer, in which the wearer focuses on a focal point (PF), preferably opposite him or her. The focal point is, for example, the reflection in the mirror of the middle of the bridge of the frame. By the arrangement of the equipment, and in particular the use of a one-way mirror 3, the wearer does not focus on the axis of the objective of the image capture device 2.

In a second step, the optician asks the wearer to turn his or her head around a vertical axis, while continuing to focus on the focal point PF, according to an angle α preferably between 10° and 30° with respect to the first image capture (image 1), and more preferably between 15° and 25° with respect to the first image capture (image 1). The subject is then still wearing the accessory including the markers 10 to 15. The image capture device 2 then performs a second image capture (image 2).

Advantageously, the two images can be chosen from the same video sequence: during the recording of the video, the wearer naturally focuses opposite him or herself in the far-sighted position, then turns his or her head around a vertical axis.

Advantageously, one of the two image captures corresponds to a reference position for the measurements concerning the customisation of lenses or the mounting of lenses, such as the far-sighted position or the near-sighted position. It then enables the equipment to determine the position and tilt of the head of the wearer according to the six possible axes of freedom when the wearer is in the far-sighted position (or near-sighted position according to the chosen reference position).

A first use of the equipment in order to determine the boxing rectangles will now be described.

Figure 1:
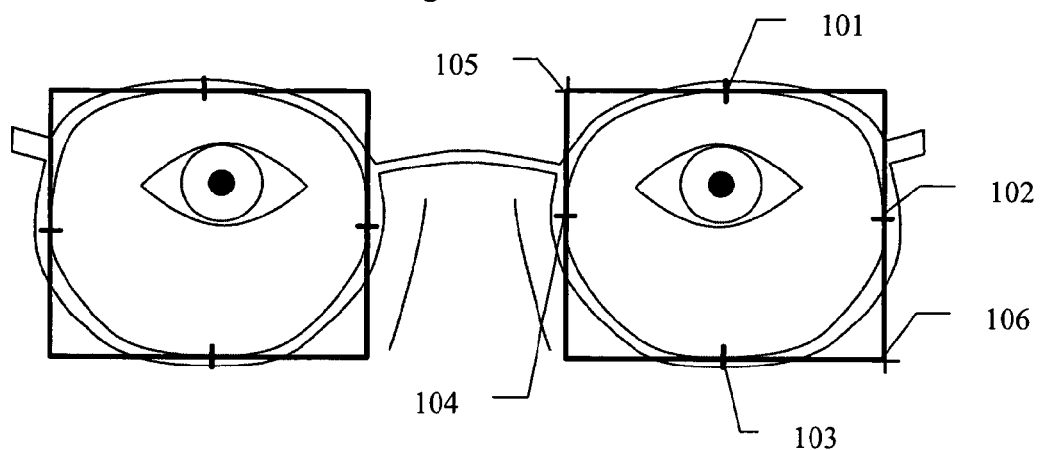
FIG. 1 is a front view of rectangles containing corrective lenses, with the gaze opposite.

FIG. 1 shows right and left boxing rectangles from the front view: reference points PRefA 101, PRefB 102, PRefC 103 and PRefD 104 concern the left box and enable the position of the remarkable virtual point PRV1 105 and the remarkable virtual point PRV2 106 to be determined.

Figure 2:
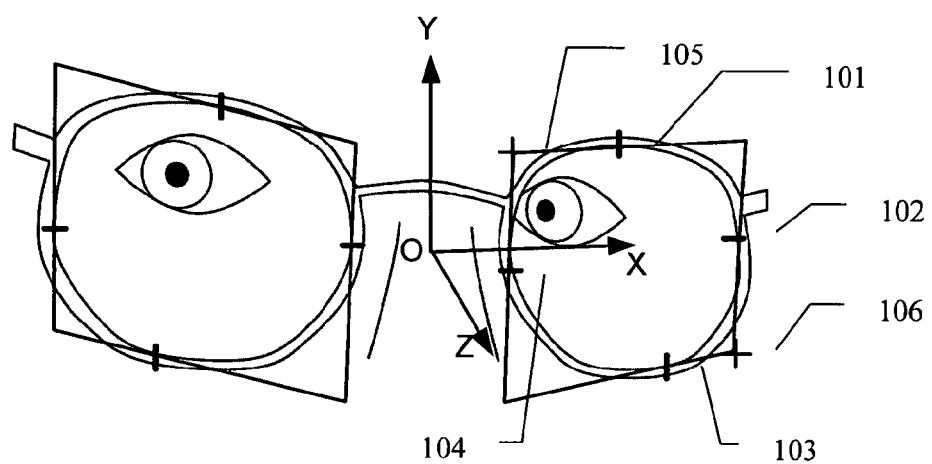
FIG. 2 is a three-quarter front view of rectangles containing corrective lenses, with the gaze at an oblique angle.

FIG. 2 shows the boxing rectangles in the three-quarter front view, in the case of a curved frame. The boxing rectangle corresponds to the rectangle containing the projection of the external cutout of the lens on the neutral plane of the lens. This surrounding rectangle is calculated in the reference Ox'y' (projection of axes of reference 3D Oxyz on the neutral plane of the lens). It appears clearly in this view that point PRV1 105 does not physically exist, but that it can be determined by knowing points PRefA 101, PRefB 102, PRefC 103 and PRefD 104, or by knowing the boxing lines (DBox) containing the horizontal and vertical segments (according to Ox' and Oy') based on these points.

To calculate the remarkable virtual points PRV1 105 and PRV2 106, an advantageous relationship (RPRV, PRef) can be obtained by considering the following geometric constraints:

the right and left boxes are symmetrical with respect to the plane defined as passing through the middle of the bridge of the frame and perpendicular to the axis formed by the centres of markers 10 and 13 of FIG. 4;

the boxing lines passing through points 101 at the right and at the left determine a plane that is parallel to the axis formed by the centres of markers 10 and 13 of FIG. 4;

similarly, the boxing lines passing through points 103 at the right and at the left determine a plane that is parallel to the axis formed by the centres of markers 10 and 13 of FIG. 4;

the segment passing through 102 is perpendicular to the segments passing through 101 and 103, respectively;

the segment passing through 104 is perpendicular to the segments passing through 101 and 103, respectively;

the segments passing through 102 are parallel to the segments passing through 104. The segments passing through 101 are parallel to the segments passing through 103. Thus, the segments passing through the four points 101, 102, 103 and 104 define a rectangle of which two sides are parallel to the axis formed by the centres of markers 10 and 13 of FIG. 4.

The central unit has, preferably with suitable programming, means for analyzing images captured by the image capture device and intended to:
- identify, in an image capture performed by the image capture device 2, the top markers; this identification is performed, in particular, by filtering of the image over the wavelength corresponding to the colour of the visual markers, owing to colorimetric filtering means;
- determine the position and three-dimensional orientation of the accessory 5 with respect to a reference point of the image capture device 2 by estimating the position, by means of parameters known to the image capture device 2 (in particular the focal length, the optical centre and the distortion) and the arrangement of the markers in the space known at a reference point associated with the accessory 5; for this, reference can be made to the POSIT algorithm, proposed by D. de Menthon and L. S. Davis in "Model-Based Object Pose in 25 Lines of Code", International Journal of Computer Vision 15, pages 123-141, June 1995;
- calculate, according to said coordinates, the position and tilt of the wearer's head (PIT), preferably according to the six possible degrees of freedom, so as to integrate all of the possible movements of the head;
- place PRV1 and PRV2 at stationary default positions at a reference point associated with the wearer's face or a reference point associated with the frame;
- place the boxing lines (DBox) successively on each image, by image analysis means or manually;
- upon each addition of a new boxing line (DBox) in an image, readjust the positioning of points PRV1 and PRV2 so that the projection, onto the images, of the boxing lines (DBox) previously positioned remains unchanged.

It should be noted that, without the use of the relationship (RPRV, PRef) integrating the constraints associated with the geometry of the frame, it would be necessary to place, by image analysis means or manually, the sixteen boxing lines (DBox) (four lines at the left, at the right and in the two images image 1 and image 2) so as to locate the remarkable virtual points PRV1 105 and PRV2 06 at the right and at the left. However, the relationship (RPRV, PRef) makes it possible to arrive at the same result by placing only seven boxing lines (DBox):
- the two boxing lines (DBox) 104 at the right and at the left in the first image capture (image 1). The middle of these lines locates the middle of the bridge of the frame and therefore the plane of symmetry of the right and left boxes;
- boxing lines (DBox) 104 in image 2 at the right or at the left, with the other side being located by symmetry;
- a boxing line (DBox) 102, at the right or at the left, in each of the images image 1 and image 2. It is possible to place one at the right in an image and one at the left in the other image;
- lines 101 and 103 are placed only once for the two sides and in a single image.

A second use of the equipment will now be described for the determination of the position of the eye's centre of rotation (CRO).

The position of the remarkable points is identified (automatically or manually) in each of the two images captured according to the protocol described above. The remarkable points in this embodiment are the corneal reflections for the measurements associated with the eye's centre of rotation.

As the eye's centre of rotation is not visible in the image, points visible in the image called reference points PRef (in this case the corneal reflection) as well as a model establishing the relationship between the position of the reference points PRef and the 3D position of the virtual points are used. For example, in this relationship, denoted RPRV, PRef will be in the form of a logic function called the FPRV projection function giving the position in the image of a reference point PRef as a function of the 3D position of a remarkable virtual point PRV.

The FPRV projection function is therefore a function of which the input parameter is the CRO and that deduces the position of the reference points PRef in the images therefrom.

Figure 5:
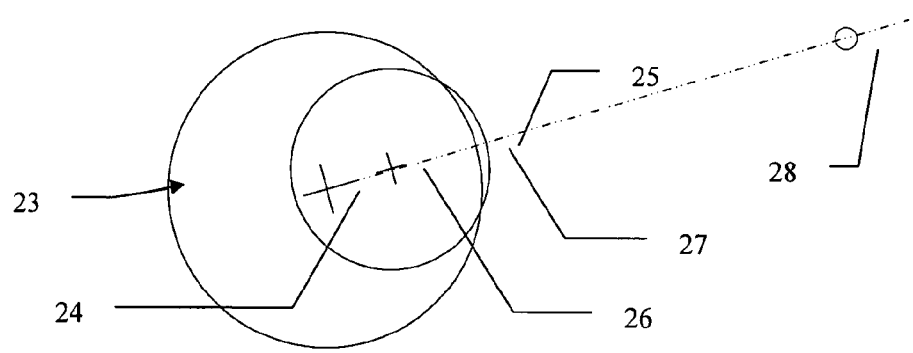
FIG. 5 shows a model of the eye focusing on a target.

A model 23 of the eye focusing on a target, shown in FIG. 5, is used, and comprises the following parameters:
- a radius of the eye (RO) indicating the distance between the eye's centre of rotation (CRO) 24 and the edge of the cornea 25, measured in the axis of the gaze;
- the distance (DeltaC) between the CRO and the centre of the radius of curvature of the cornea 26; and
- the radius of curvature of the cornea (RCC) being the distance between the centre of the radius of curvature of the cornea 26 and the edge of the cornea 25.

These parameters can be defined by average values measured on subject samples. Typically, RO is 13 mm, DeltaC is 5 mm and RCC is 8 mm. The real values of the model 23 can fluctuate from one individual to another, but the use of average values has only a very slight influence on the results.

The axis of the gaze is defined by the line linking the CRO 25 and the centre of the radius of curvature of the cornea 26, with the latter being capable of being deduced from the radius of curvature of the cornea (RCC) and positions, with respect to the camera, of the corneal reflection RC and the lighting device 4.

As an alternative to the corneal reflection (RC), it is possible to take the centre of the pupil 27 as the reference point (PRef). The axis of the gaze is then defined by the line connecting the CRO 24 and the centre of the pupil of the eye 27.

When the eye directs its gaze toward a focal point (PF) 28, points 24, 26, 27 and 28 are aligned.

On the basis of the position of the CRO and that of the wearer, the direction of the gaze is calculated. As the wearer looks at him or herself in the mirror, the direction of the gaze may be calculated owing to the position of the focal point PF, because it is itself deduced as a function of the position of the camera and of the wearer. The focal point PF is then the mirror image of the gaze point (for example, the middle of the bridge of the frame calculated from the position of the accessory 5) with respect to the plane of the mirror. The direction of the gaze is therefore the vector defined by the ordered pair (CRO, PF). It is possible, in an alternative embodiment of the invention, to use a plurality of remarkable points of the eye, preferably at different distances from the CRO in order to calculate the direction of the gaze. These points may be a combination of points chosen from among those of the image of the pupil of the eye, the iris and the corneal reflection.

On the basis of the CRO and the direction of the gaze, the position of the centre of the radius of curvature of the cornea (CRCC) is calculated.

On the basis of the CRCC, the radius of curvature of the cornea RCC and the known position with respect to the camera of the LED lighting device, it is possible to apply the Snell-Descartes law for the reflection of a ray of light on a reflective surface and thus project the corneal reflection onto the image that defines a reference point PRef.

The function FPRV enabling the 2D positions of the reference point PRef on the images to be known on the basis of the 3D position of the virtual point does not have an inverse function that is easy to calculate analytically and enabling the CRO to be obtained on the basis of reference points. One of the reasons for this difficulty is that the corneal reflection (RC) and the pupil are moved with respect to the wearer's head between each image capture and therefore have three-dimensional coordinates at the spatial reference point (RS) that differ for each image, image 1 and image 2. Consequently, methods other than a direct calculation are used to obtain the position of the CRO on the basis of the reference points PRef. It is, for example, possible to use successive iterations searching for the CRO position by optimisation.

Numerous optimisation methods known in the prior art can be applied in order to optimise the 3D position of the remarkable virtual point PRV by minimising the projection error. It is possible, for example, to define a function FOPT to be optimised, taking, as the parameter, a 3D point PRV returning the sum SDDeltaPRef of the distances in each image (image 1 and image 2) between the reference point(s) PRef observed in the image and the point projected by the projection function FPRV on the basis of the assumed position of the remarkable virtual point PRV. Here we present a simple but effective implementation of the gradient descent method consisting of performing the following steps:

initialising the position of the remarkable virtual point PRV at a probable position PRVinitial close to the final value so as to prevent any local minima. For this, it is possible to take, as a starting point, the position in space of the closest point of the two observation lines (DO1 and DO2) formed by the optical centre of the camera and the position of the reference point PRef in each image (image 1 and image 2), with these points PRef in this case being the corneal reflections observed in the images (image 1 and image 2). The position of the CRO PRVinitial obtained will be the first current position of the CRO PRVcurrent during the iterative optimisation calculation;

repeating the following sub-steps by iteration:
  calculating the function FOPT applied to the current point PRVcurrent. This amounts to performing the following sub-steps:
    calculating, for each of the images (image 1 and image 2), the position of the theoretical reference point PReftheoretical as being the projection of the current point PRVcurrent by applying the projection function FPRV thereto;
    calculating the sum SDDeltaPRef of the distances obtained for each of the images (image 1 and image 2) between the reference point PRef observed in the image and the point calculated by projection PReftheoretical;
  when the sum of the distances SDDeltaPRef is lower than a predefined threshold, stopping the iterations; otherwise:
    estimating the gradient vector of the function FOPT at the current position of the CRO PRVcurrent by causing the current position PRVcurrent to fluctuate slightly according to its degrees of freedom (3 degrees in the case of a 3D point), for example, by adding a value much lower than the precision of the final measurement successively to each of the coordinates XPRV, YPRV then ZPRV in order to calculate a derivative for each of the coordinates XPRV, YPRV, ZPRV of the current CRO point PRVcurrent, with these derivatives forming the three-dimensional gradient vector DFPRV of the projection function FPRV at the current point PRVcurrent;
    subtracting the gradient vector DFPRV at the current point PRVcurrent in order to obtain the current position PRVcurrent of the next iteration.

This optimisation method is of course non-limiting and a person skilled in the art may, if necessary, adapt it according to situations encountered by referring to the prior art relating to multiparametric optimisation so as, for example, to optimise the convergence speed of the algorithm (for example, dynamic adjustment of the convergence coefficients) or to prevent local minima (for example, by simulated annealing).

In particular, to optimise the position of the CRO, it is advantageous to use another method that is effective owing to its good calculation precision/cost ratio. This method consists of the following steps:

the position of the virtual point is initialised at a probable position. For the CRO, it is possible to take, for example, a default position corresponding to average values for the interpupillary distance, the height and the lens-eye distance. It is also possible to take, as a starting point, the position in space of the point closest to the two lines formed by the optical centre of the camera and the centre of the corneal reflection in each image. The CRO position obtained will be the first current position of the CRO during the subsequent iterative calculation;

the following iteration is performed until the desired positioning precision is obtained:
  by means of the projection function, the position of the reflection in each pRC image is calculated;
  in each image, the distance between the calculated position and the observed position is calculated. If the maximum distance between the two images is much lower than the precision of the positioning of the corneal reflection observed in the image, the optimisation is stopped and the current position of the CRO is kept;
  the current position of the CRO in the pCRO image is projected onto each image. A translation vector (pRC, pCRO) representing the offset between the CRO and the corneal reflection is obtained for each image;
  the corneal reflection observed with pRC, pCRO is translated in each image. The projection of the CRO of the next iteration is obtained on each image;
  the 3D position of the CRO is calculated by means of the two projections.

The projection function is not limited to a projection onto the image, because if the remarkable point or any intermediary point can be positioned in 3D, the optimisation may be performed over a 3D distance.

Conversely, in certain situations, the relationship RPRV, PRef retained may give a satisfactory estimation of the position of the remarkable virtual point PRV as a function of the position of the reference point PRef, for example the position of the remarkable virtual point PRV projected onto the image (image 1 or image 2) of the remarkable virtual point PRV as a function of the position on this same image of the reference point PRef associated with the position of the wearer with respect to the camera, indicating in particular the distance of the wearer with respect to the camera and the direction of his or her gaze. The two-dimensional point PRef associated with the distance of the wearer with respect to the camera thus provides a three-dimensional approximation of the position of this reference point PRef. The projections of the PRV points obtained with the relationship RPRV, PRef can then define two new observation lines (DO1 and DO2) respectively for each image (image 1 and image 2), with the position of the remarkable virtual point PRV in the desired reference point being the position of the intersection point, or, if these lines are not strictly secants, closer to the two observation lines (DO1 and DO2).

By using a third image capture (image 3) and the measurement of the eye's centre of rotation CRO already obtained with two images, the invention also enables the radius of the eye to be measured. In the third image capture (image 3), the subject focuses on a target of which the position is known or can be estimated with respect to the camera and preferably placed so that the angle formed by the direction of the gaze with respect to the axis between the CRO and the optical centre of the camera is substantially different from this same angle during the other two image captures (images 1 and images 2). A possible method for calculating the radius of the eye is to use one of the two optimisation methods presented above and to apply it to the three images. The radius of the eye, which was previously a constant of the model of the eye used for the projection function FPRV, in this case becomes an additional parameter to be optimised.

An alternative embodiment of the invention involves combining a plurality of remarkable virtual points and/or a plurality of reference points. Once the position of a PRV has been measured with the present invention, it can easily be used as a reference point in order to measure, by means of another relationship (RPRV, PRef), the position of another PRV, either directly or in combination with other PRefs. This alternative enables, for example, the Frankfort plane relative to the subject to be measured.

To facilitate the acquisition of measurements with portable equipment, for example, an advantageous solution consists of taking into account a remarkable morphological plane, namely the Frankfort plane.

The Frankfort plane is defined as being the plane passing through the sub-orbital points and the porion, with the porion being the highest point of the auditory canal of the skull.

It is commonly agreed that this plane is horizontal when the subject, who is upright, looks straight ahead at eye level. As this posture is the reference position for "far-sighted" measurements, it is very advantageous to be capable of measuring the position of the Frankfort plane with respect to a horizontal plane. Indeed, with the measurement of the Frankfort plane and the position of the CRO, it is possible to calculate the direction of the gaze with respect to the eyeglass lens or the frame, for a given posture and focal point, thereby enabling "far-sighted" measurements to be calculated even if the subject was not in a far-sighted posture when the measurement was taken. Indeed, it is often less precise to measure the real position of the far-sighted subject than to use the Frankfort plane, because the subject may not have a natural position when the measurement is taken. This occurs in particular when the subject is stressed out, or does not understand the importance of the optician's instructions or if the subject is influenced by the sighting device, i.e. the subject does not have a free posture when looking at an LED or when looking at a mirror. It is then up to the optician to decide whether to use the measured head position or the Frankfort plane as a reference of horizontality for "far-sighted" measurements.

In addition, it may be advantageous with the use of an economical portable-type device not to have to control the horizontality with respect to the camera. The Frankfort plane would then be the reference for the "far-sighted" head position.

Figure 6:
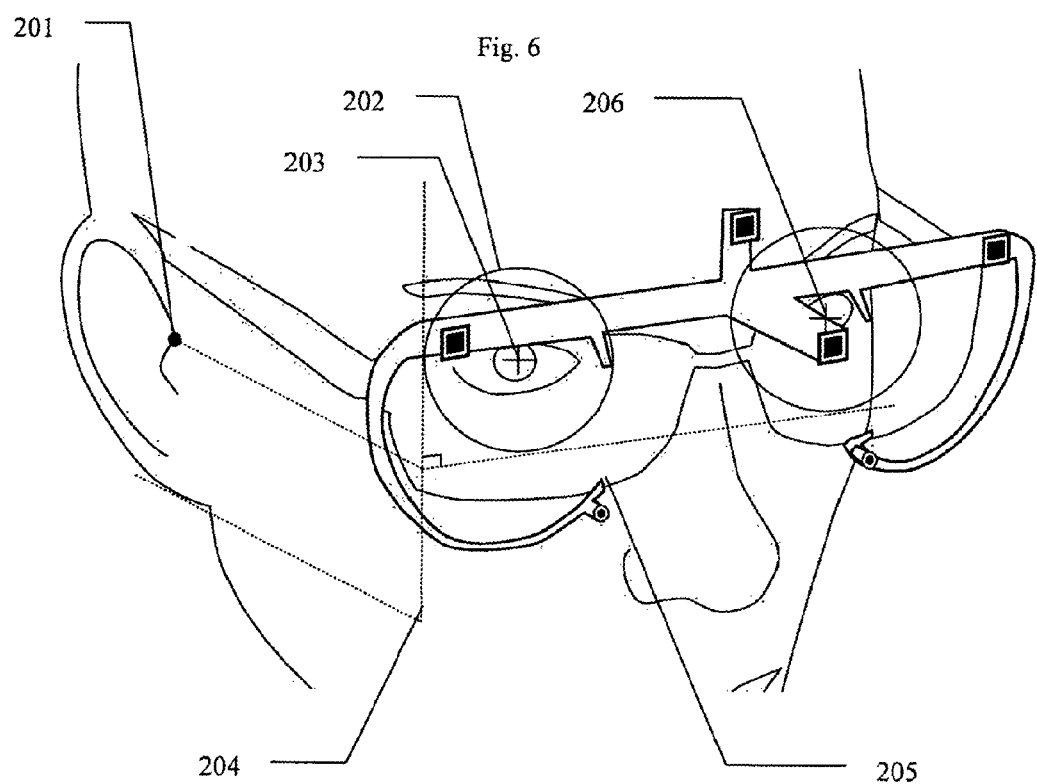
FIG. 6 is a diagrammatic view of a face with the determination of the Frankfort plane with the entry of a single point on the three-quarter image.

FIG. 6 shows a diagrammatic view of a face with the determination of a good approximation of the Frankfort plane (APF) with the entry of a single point on the three-quarter image (point 201), which approximation is defined below.

The plane of the tragion 204 is perpendicular to the axis passing through the centres of rotation of the eye 203, 206 and which passes through the outermost temporal edge of the ocular orbits 202.

The Frankfort plane 205 is defined by the tragions 201 and the bottom of the ocular orbits 202.

The Frankfort plane was historically measured on skulls in anthropology, then in radiography, in particular in dentistry, in which the orbital spheres and the porions are visible.

To be capable of determining the Frankfort plane in a simple manner in a living person, without using radiography to determine the position of the porion, or without using palpation to determine the position of the sub-orbital point, the approximation APF of the Frankfort plane can be used: this approximation of the Frankfort plane is defined as the plane passing through the tragion of the ear, visible in the three-quarter image, parallel to the ACRO line passing through the two CROs, and located at a known distance DPF from said axis ACRO.

The distance DPF, of around 22 millimeters, may be adjusted first with the available knowledge of the human anatomy, then experimentally so as to optimise the measurement results. The approximation APF of the Frankfort plane is thus tangential to the cylinder CYPF defined by all of the points being at the distance DPF from the axis ACRO. Then, the position of at least one tragion on at least two images of the face of the subject wearing the accessory 5 is placed manually, automatically or in a semi-assisted manner. As the points of the tragion are reference points (visible) and the tragion TG is immobile at the reference point of the accessory 5, it may be positioned in 3D as the intersection of the two observation lines DO1 and DO2. The Frankfort plane can then easily be calculated as being the plane containing the point TG and tangential to the cylinder CYPF. It will obviously be possible to adjust this calculation model during experimental measurements, for example by modifying the value DPF or by adding a constant to the tilt with respect to the horizontal of the plane obtained.

There is a disadvantage to this approach: it is important that the optician obtain the measurement quickly (so as not to make the clients wait), simply and with a minimum number of manual interventions so as to minimise the risk of error. However, of the two images already taken for the other measurements, one is frontal (the far-sighted position) and, for numerous subjects in the frontal position, the tragions are not visible or are difficult to position. However, a tragion is clearly visible in the three-quarter view. However, again, the CRO makes it possible to place a point that is not visible in the image. Indeed, the porion is located in a plane perpendicular to the axis ACRO at a fixed distance DTG of which the value may be experimentally optimised but which can be estimated at 18 mm owing to knowledge of the human anatomy. When the subject has a relatively horizontal head position (more or less 10° with respect to the Frankfort plane), even approximate values for the distance DTG enable a precise measurement of the tilt of the Frankfort plane (around the nearest degree or better).

When the CRO is not measured, it is still possible to use the centre of the pupils or the corneal reflection, with the latter being at substantially the same height as the CRO when the subject's head position is close to the far-sighted position, i.e. when the Frankfort plane is close to horizontal.

If the CRO or the tragion are poorly defined, it is also possible to estimate the Frankfort plane by replacing the CRO or the tragion with coordinates of another remarkable morphological point of the eye or of the face, such as the sub-nasal point, or by combining this information.

Figure 7:
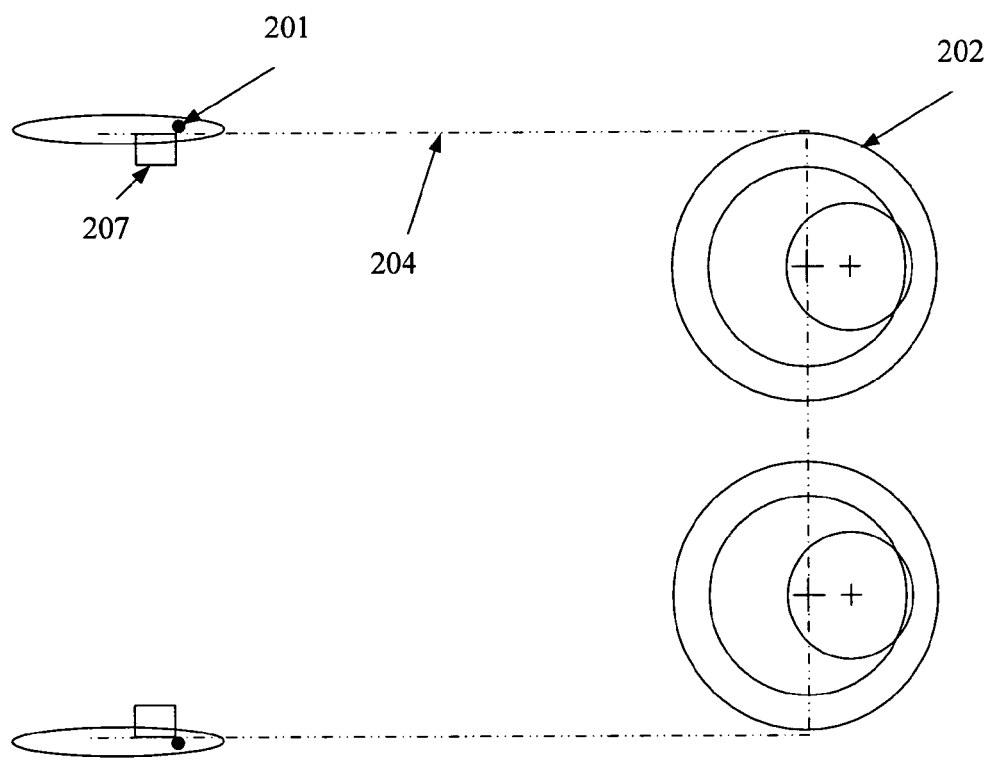
FIG. 7 is a diagrammatic top view of the line of the tragion.

FIG. 7 shows a diagrammatic top view of the line of the plane of the tragion 204 containing the tragion 201 and positioned with respect to the position of the auditory canal 207 and the ocular orbits 202.

The invention is suitable for determining remarkable anatomical-type points, such as the eye's centre of rotation, the sub-orbital point enabling the Frankfort plane to be defined and the tragion when it is not visible in the two images. It is also suitable for determining remarkable points associated with the frame and in particular the apexes of the points surrounding the corrective lens.

The invention has been illustrated and described in detail in the drawings and in the above description. It must be considered to be illustrative and provided as an example and not to limit the invention to this description alone.

In the claims, the word "including" does not rule out other features and the indefinite article "a/an" does not rule out a plurality.

The invention claimed is:

1. A method for measuring the position of a remarkable virtual point (PRV) that is either the eye's center of rotation (CRO) or a point of which the distance with respect to the edge of the cornea is known of a subject wearing corrective lenses in a spatial reference point associated with the subject's head, in which said method comprises:
    a step of acquiring at least two images of all or some of the face of the subject by image acquisition means having an optical center, the images being acquired in situations corresponding to distinct angles of vision/head, the subject looking at a focal point (PF) generated by a device and, in one image at most among said at least two images, the direction of the gaze passes, through the optical center of the image acquisition means;
    a step of estimating the position of the face with respect to the image acquisition means by processing said at least two images;
    a step of determining, in the said at least two images, coordinates (Xpref, Ypref) of one or more reference points formed by corneal reflection caused by an external lighting source or by the pupil center;
    characterized in, that the remarkable virtual point is visible at most in the one image at most in which the direction of the gaze passes through the optical center of image acquisition means and the position of the remarkable virtual point is associated by a predetermined geometric relationship with the coordinates of the reference point(s) according to a geometric modeling of the eye focusing on a target, which modeling is three-dimensional or projected onto the plane of the at least two images, said measurement method also comprises a step of calculating at least one of the coordinates (XPRV, YPRV, ZPRV) of the remarkable virtual point (PRV) at the spatial reference point on the basis of coordinates determined for the reference point(s) by using the geometric relationship.

2. Method according to claim 1, characterized in that said reference points of the geometric relationship vary in the spatial reference point of the acquisition, from one image to another.

3. Method according to claim 1, characterized in that the step of calculating at least one of the coordinates (XPRV, YPRV, ZPRV) of the remarkable virtual point (PRV) consists of:
    applying an initial hypothesis for a theoretical remarkable virtual point (PRVinitial) to at least one of said coordinates (XPRV, YPRV, ZPRV);
    calculating a theoretical reference point (PReftheoretical) by using the geometric relationship;
    if the distance between the theoretical reference point (PReftheoretical) and the reference point observed (PRef) is greater than a predetermined value, modifying said hypothesis at least once so as to minimize said distance.

4. Method according to claim 1, characterized in that, during the image acquisition, the subject looks at a focal point (PF) generated by a device, with the optical distance between the subject's eye and the focal point (PF) being different from the optical distance between the subject's eye and the acquisition means.

5. Method according to claim 1, characterized in that the subject looks at his or her reflection during the acquisition of images by means of a mirror.

6. Method according to claim 1, characterized in that the image acquisition means are comprised of a camera recording a sequence of images.

7. Method according to claim 6, characterized in that the recording of the images occurs when the subject looks at a focal point PF of which the position with respect to the image acquisition means is known.

8. Method according to claim 1, characterized in that it also comprises a step of estimating the direction of the gaze, taking into account at least two characteristic points of the eye on said images.

9. Method according to claim 1, characterized in that, as the acquisition means comprise at least two image capture devices, the step of estimating the position of the face with respect to the image acquisition means is performed by processing a series of images acquired simultaneously.

10. Method according to claim 1, characterized in that the step of estimating the position of the face with respect to the image acquisition means by processing said images is performed by acquiring an image of the subject wearing a device equipped with at least three reference markers.

11. System for measuring the position of a remarkable virtual point (PRV) that is either the eye's center of rotation (CRO) or a point of which the distance with respect to the edge of the cornea is known of a subject wearing a corrective lens at a spatial reference point associated with the corrective lens, comprising:
    means for acquisition of at least two images of all or some of the subject's face, the acquisition means having an optical center, the images being acquired in situations corresponding to distinct angles of vision/head, the subject looking at a focal point (PF) generated by a device and, in one image at most among said at least two images, the direction of the gaze passes through the optical center of the image acquisition means;
    a device for calculating the position of the face with respect to the image acquisition means by processing said at least two images;
    means for determining, in the said at least two images, coordinates (Xpref, Ypref) of one or more reference points formed by corneal reflection caused by an external lighting source or by the pupil center;
    characterized in that the remarkable virtual point is visible at most in the one image at most in which the direction of the gaze passes through the optical center of image acquisition means and the position of the remarkable virtual point is associated by a predetermined geometric relationship with the coordinates of the reference point(s) according to a geometric modeling of the eye focusing on a target, which modeling is three-dimensional or projected onto the plane of the at least two images, and said measurement system also comprises a device for calculating at least one of the coordinates (XPRV, YPRV, ZPRV) of the remarkable virtual point (PRV) at the spatial reference point on the basis of the determined coordinates of the reference point(s) by using the geometric relationship.

12. Computer program including program code instructions recorded on a non-transitory computer readable medium, for implementing the steps of the method according to claim 1 when the program is run on a computer.

* * * * *